(12) United States Patent
Bottura (10) Patent No.: US 7,762,273 B2
(45) Date of Patent: Jul. 27, 2010

(54) VENTING DEVICE

(75) Inventor: Cesare Bottura, Brescia (IT)

(73) Assignee: OLAB S.r.l., Brescia (IT)

( * ) Notice: Subject to any disclaimer, the term of this patent is extended or adjusted under 35 U.S.C. 154(b) by 600 days.

(21) Appl. No.: 11/770,910

(22) Filed: Jun. 29, 2007

(65) Prior Publication Data

US 2009/0000667 A1    Jan. 1, 2009

(51) Int. Cl.
*F16K 24/04* (2006.01)
(52) U.S. Cl. .................. 137/199; 137/173; 137/197
(58) Field of Classification Search .............. 137/173, 137/177, 183, 184, 197, 199, 202–204, 193, 137/512.2, 512.3, 512.5, 512; 96/159, 162, 96/163, 165, 168
See application file for complete search history.

(56) References Cited

U.S. PATENT DOCUMENTS

| | | | | |
|---|---|---|---|---|
| 340,454 A * | 4/1886 | Olds | ........................ | 137/203 |
| 1,454,347 A * | 5/1923 | Stoms | .................... | 137/512.2 |
| 1,512,597 A * | 10/1924 | Harmon | ...................... | 137/512 |
| 1,560,272 A * | 11/1925 | McAusland | ............. | 137/512.3 |
| 1,617,711 A * | 2/1927 | Hennebohle | ................ | 137/512 |
| 1,724,878 A * | 8/1929 | Jensen | ........................ | 137/512 |
| 2,026,163 A * | 12/1935 | Drake | ..................... | 137/512.3 |
| 2,960,996 A * | 11/1960 | Haselton | ..................... | 137/173 |
| 3,081,730 A * | 3/1963 | Dvorachek | .................. | 137/512 |
| 3,123,093 A * | 3/1964 | Ackerman et al. | ....... | 137/512.2 |
| 3,916,946 A * | 11/1975 | Motzer | ..................... | 137/512.2 |
| 4,197,097 A * | 4/1980 | Magorien et al. | ............. | 96/163 |
| 4,640,304 A | 2/1987 | Looney | | |
| 5,019,141 A | 5/1991 | Granville et al. | | |
| 5,125,429 A * | 6/1992 | Ackroyd et al. | .......... | 137/512.2 |
| 6,247,487 B1 | 6/2001 | Skill | | |

FOREIGN PATENT DOCUMENTS

EP           1795790         6/2007
WO       WO 01/23792 A1    4/2001

OTHER PUBLICATIONS

European Search Report for EP 05 42 5876, dated May 16, 2006, 5 pages.

* cited by examiner

*Primary Examiner*—John Rivell
*Assistant Examiner*—Craig Price
(74) *Attorney, Agent, or Firm*—Kilyk & Bowersox, P.L.L.C.

(57) ABSTRACT

The object of the present invention relates to a venting device, which can be connected to a tank containing air and water. The device comprises a first venting path for the air and first intercepting means, set along this, which are suitable for closing the first path. The device also comprises a second venting path for the water and second intercepting means, set along this, which are suitable for opening the second passage to deliver the water. The first intercepting means can be influenced by the water to go from the open configuration to the closed configuration, so that when the air has been vented out, the water reaches a set greater pressure limit, opens the second intercepting means and can be delivered outside.

24 Claims, 5 Drawing Sheets

VENTING DEVICE

BACKGROUND OF THE PRIOR ART

1. Field of the Invention

The object of the present invention relates to a venting device for a tank, wherein at least one fluid is contained. In particular, the object of the present invention relates to a venting device for a tank, wherein a bi-phase system is contained.

2. Description of the Prior Art

Some apparatus comprises a tank for heating, wherein at least one fluid is contained, for example water. In order for the apparatus to work properly, the water needs to come out of the tank at a set pressure.

Consequently, the apparatus also comprises a venting valve, coupled to the tank, which opens in relation to set values of the pressure of the fluid inside the tank.

However, it has been noticed that, contrary to what is desirable and necessary for proper working of the apparatus, the conditions for expelling the water do not remain constant between one use and another.

It is the object of the present invention to satisfy the above needs and, at the same time, remedy the above disadvantages, with reference to the prior art.

SUMMARY OF THE INVENTION

The problems are solved by a venting device that can be connected to a tank, wherein the tank exhibits an internal chamber containing a first fluid and a second fluid.

The device comprises:

a first venting path suitable for joining the internal chamber of the tank to the outside;

first intercepting means, set along the first venting path, which are suitable for going from an open configuration, wherein they allow the first fluid to pass from the chamber inside the tank to the outside, to a closed configuration, wherein they close the first path, and vice versa;

a second venting path, which is suitable for joining the internal chamber of the tank to the outside; and second intercepting means, set along the second venting path, which are suitable for going from a closed configuration, wherein they close the second passage, to an open configuration, wherein they allow the second fluid to pass from the chamber inside the tank to the outside, and vice versa.

First intercepting means can be influenced by the second fluid to go from the open configuration to the closed configuration.

DESCRIPTION OF THE PREFERRED EMBODIMENTS

With reference to the accompanying drawings, an apparatus comprising a tank 2 and a venting device 4 are globally indicated with reference numeral 1.

The tank 2, which exhibits an internal chamber 6, is suitable for containing two fluids, in other words a bi-phase system, with different densities, for example water and air.

The tank 2 thus contains the fluids with different densities, either because it is fed voluntarily with the fluids, or because the presence of air in the tank is unavoidable.

For example, a tank filled with water to a certain height, then covered with a lid, contains two fluids: water, which occupies a volume of water, and air, which occupies a volume of air equal to the difference between the volume of the tank and the volume of water.

The device 4 comprises a body 8 that is hollow inside and generally cylindrical shaped, which extends along an X-X body axis, between a lower portion 10, which is close to the tank in the tank assembly, and an upper portion 12, opposite the lower portion.

Inside the body 8 from the lower portion 10 to the upper portion, 12 a flange space, a central space 14 and an end space are distinguished, and together they form the internal passing cavity of the body 8.

Furthermore, the body 8 exhibits at least one delivery tube 15, which is in fluidic communication with the central space 14, for example with a radial extension in relation to the X-X body axis.

The device 4 also comprises a flange 16, which also has an internal passing cavity, connected to the body 8, which is, in particular, at least partially housed in the flange space of the body 8.

In an embodiment, the flange 16 comprises a coupling portion 18 that is suitable for being coupled to the body 8 and, in particular, received in the flange space, and a shank 20.

The coupling portion is preferably threaded and exhibits at least one safety milling.

After coupling the flange 16 to the body 8, the shank 20 protrudes at the bottom from the body 8.

Inside, the shank 20 of the flange 16, comprises an annular projection 22, which creates a reduction in the flow-area of the internal cavity of the flange 16.

On the outside, the shank 20 comprises a threaded part for coupling to the tank.

At the top, the flange 16 exhibits a spacer slot and, above this, an insert slot.

In agreement with a preferred embodiment, the device 4 comprises a spacer 30 housed in the spacer slot of the flange 16, and an insert 32, housed in the insert slot of the flange 16.

Figure 5A:
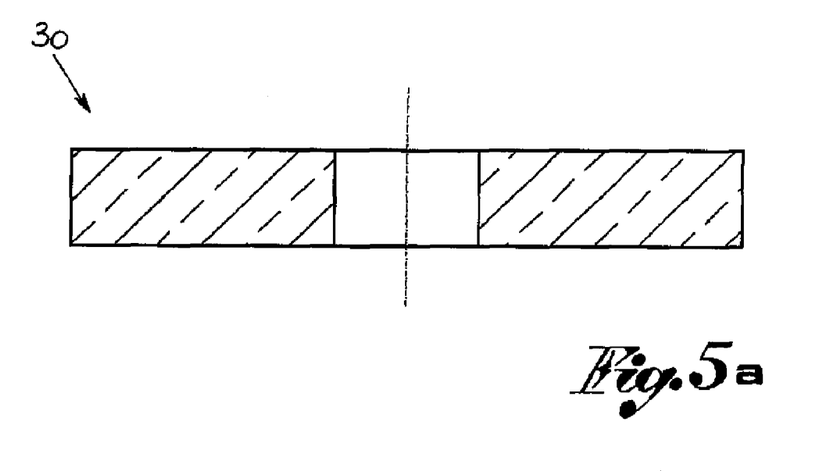
FIGS. 5a and 5b illustrate a sectioned side view and a top view respectively of a spacer of the device in FIG. 1.
Figure 5B:
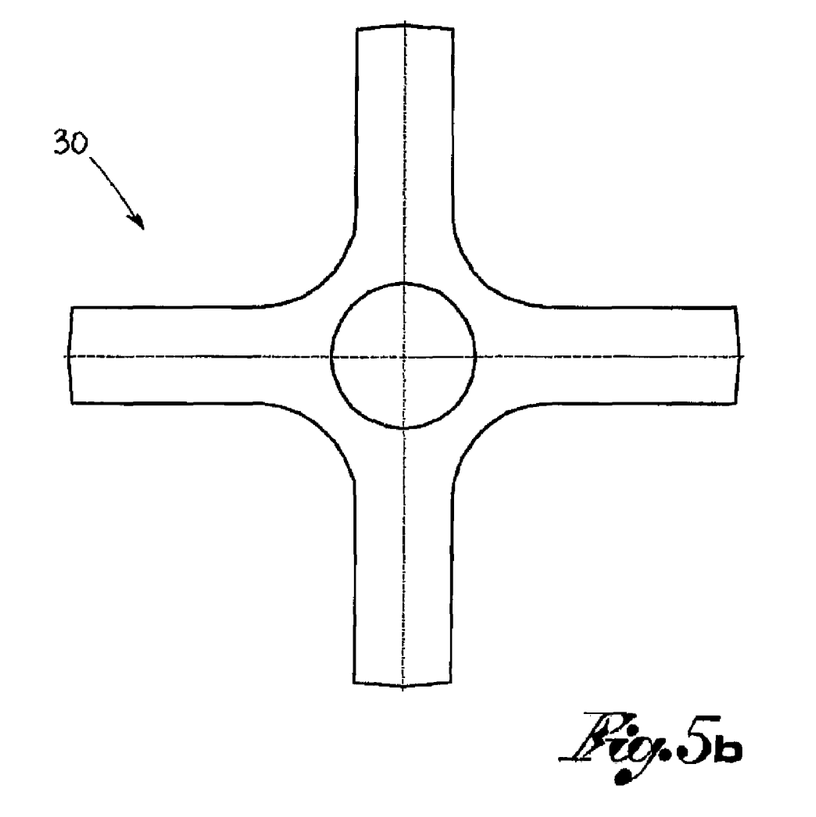

The spacer 30 is made in the form of a cross and perforated in the middle (FIGS. 5a and 5b).

In the same way, the insert 32 exhibits an internal funnel-shaped passage, made up of a lower truncated cone-shaped part and an upper cylindrical part, which creates a reduction in the flow-area of the fluids.

The device 4 also comprises a piston 40, which is also hollow inside.

A base slot, a pad slot, an intermediate tube 42 and a preferably threaded connecting slot are distinguished in the cavity of the piston 40, from its lower end to its upper end.

Furthermore, inside, the piston 40 exhibits side tubes 44 that are in fluidic communication with the intermediate tube 42, for example with a radial extension in relation to the X-X body axis.

The intermediate tube 42, exhibits a truncated cone-shaped stop slot 46 at the bottom in relation to the side tubes 44, in other words upstream of them, which narrows the flow-area of the intermediate tube 42.

Furthermore, the device 4 comprises a nut 50, which is coupled on the outside to the piston 40, for example level with its lower end, the size of which is such as to make guiding means for the piston sliding on the walls of the central space of the body.

Moreover, the device 4 comprises a seal ring 52, which is coupled on the outside to the piston 40, at the top in relation to the nut 50.

The device 4 also comprises a base 60, housed in the base slot of the piston 40, made from a perforated disc that narrows the flow-area of the piston 40.

Moreover, the device 4 comprises a pad 62, housed in the pad slot of the piston, which has a perforated, internal resting slot 64 with a funnel type configuration, comprising a lower cylindrical part and an upper truncated cone-shaped part.

The device 4 also comprises a first ball 70, made in a first material, for example an elastomeric material, housed in the intermediate part 42 of the cavity of the piston 40.

The ball 70, which moves inside the intermediate part, is confined inside this pad 62, at the bottom, and by the stop slot 46 at the top.

Furthermore, the device 4 comprises a second ball 80, made in a second material, for example an elastomeric material, which is, for example, identical to the first material, housed in the shank 20 of the flange 16.

The ball 80, which moves inside the shank, is confined inside this by the annular projection 22 at the bottom, and by the spacer 30 at the top.

Furthermore, the device 4 comprises a handle 90, coupled to the upper end of the piston 40, which is, in particular, partially housed in the connecting slot of the piston 40. The handle 90 closes the internal cavity of the piston at the top.

To illustrate the working of the venting device 4, let us say that the device is coupled to the tank 2, where there is water and air.

Figure 1:
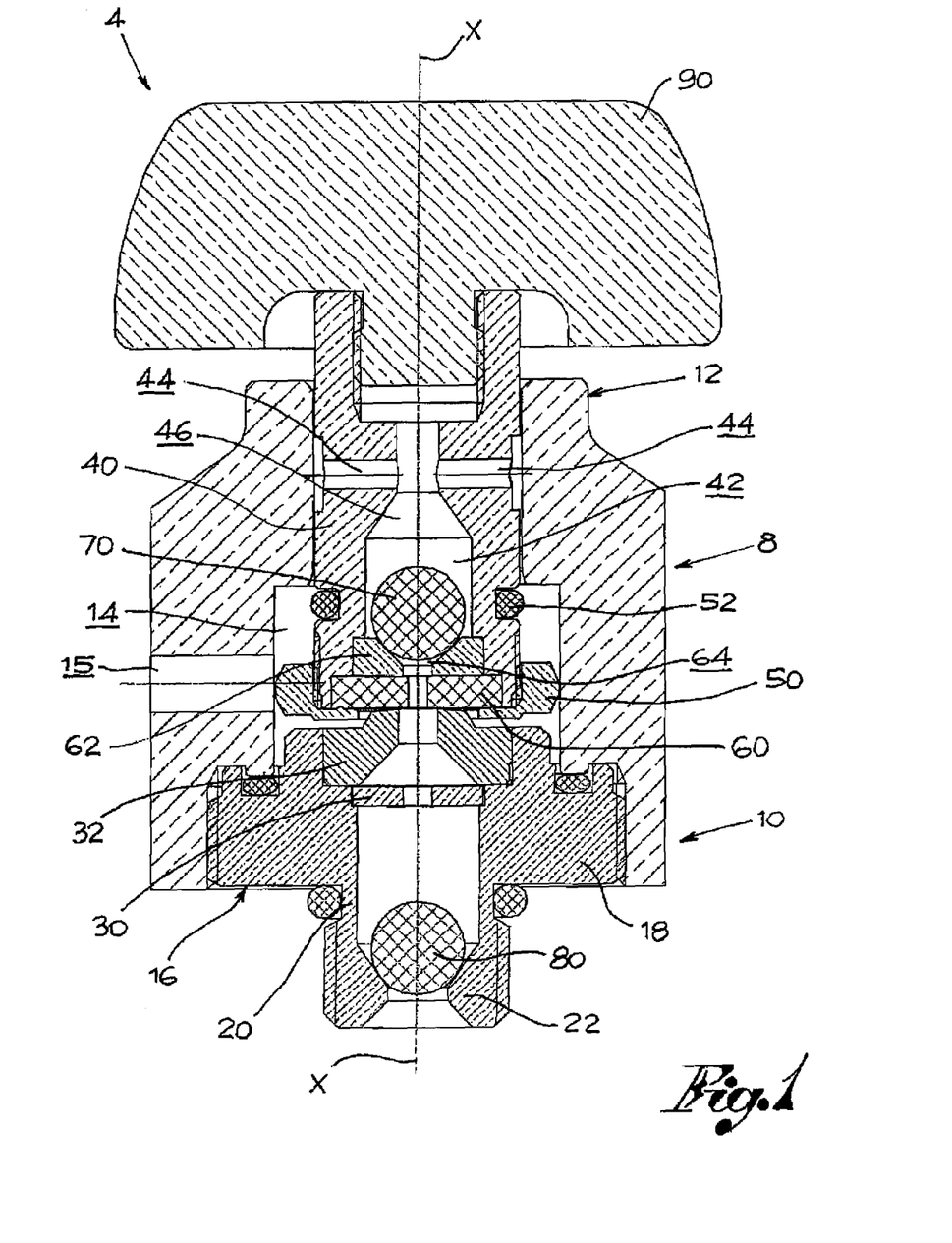
FIG. 1 represents a venting device according to the present invention, in a first configuration, called a rest configuration.

In a first configuration of the device, called a rest configuration, the second ball 80 is resting on the annular projection 22 of the flange 16, the piston 40 is resting on the insert 32, and the first ball 70 is resting on the pad 62 (FIG. 1).

In the rest configuration, the piston 40 is in a lowered position, wherein the base 60 is in contact with the insert 32, forming a seal between the piston 40 and the insert 32.

In the rest configuration, the seal ring 52, coupled to the piston 40, is located in the central space 14 of the body 8.

During normal working of the apparatus 1, the tank 2 is heated.

Figure 2:
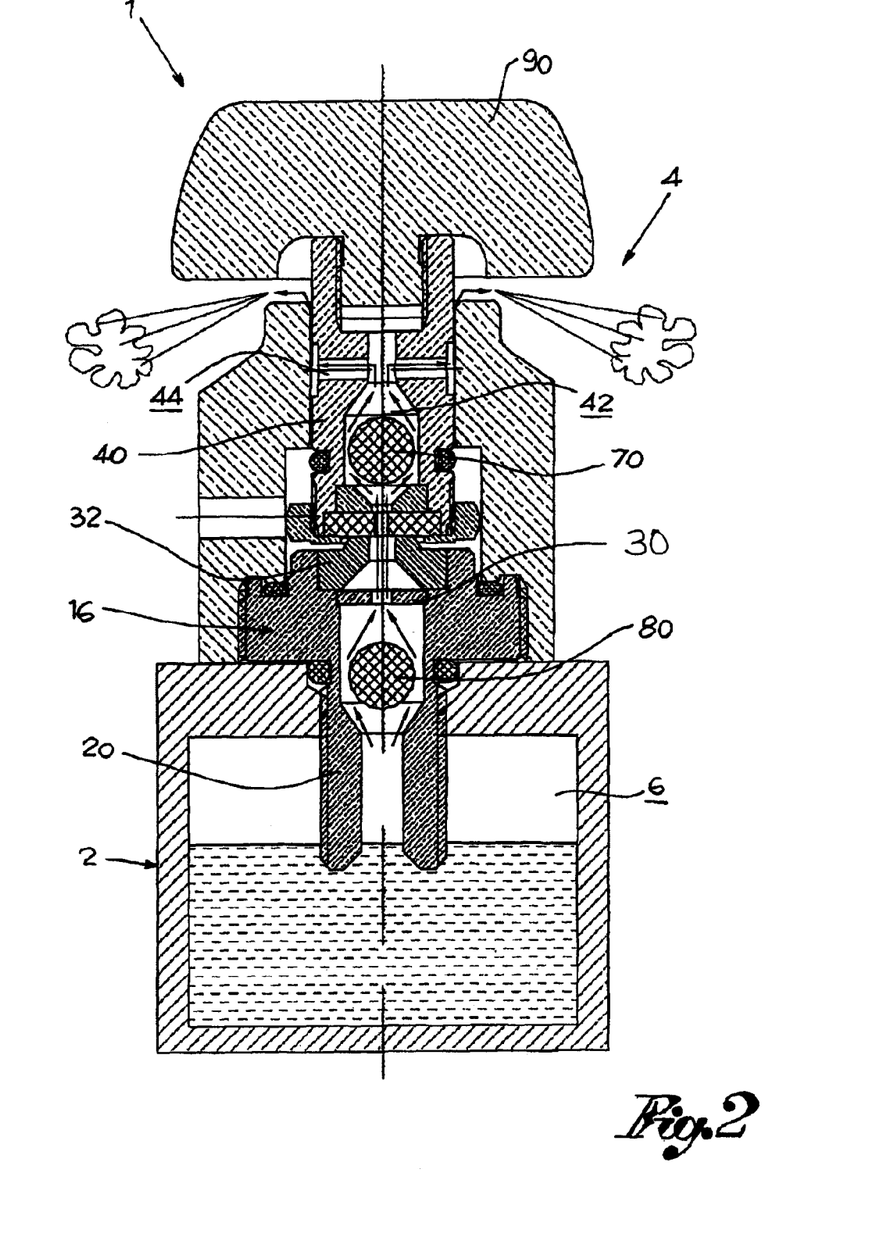
FIG. 2 shows the device in FIG. 1 in a second configuration, called an air venting configuration.

The device then goes from the rest configuration to the air venting configuration (FIG. 2). Note that by coupling the device to the tank, this being partially full of water, the shank 20 is partially immersed, generally leaving a volume of air confined inside it between the free surface of the water and the second ball 80.

When heated, the air expands, crossing the flange 16 and lifting the second ball 80, and crossing the piston 40 and lifting the first ball 70. The air vents out of the apparatus 1, through the central space 42 and the side tubes 44 of the piston 40, for example coming out from under the handle 90.

The device thus exhibits a first venting path that is suitable for joining the internal chamber 6 of the tank to the outside through which the expanding air vents out of the device.

Note that in the air venting configuration, the piston 40 remains in the lowered position, in other words resting on the insert 32, due to its weight and the weight of the parts to which it is coupled, for example the handle 90.

In other words, the fluidic continuity between the cavity of the flange 16 and the internal cavity of the piston 40 is guaranteed in the air venting configuration.

Figure 3:
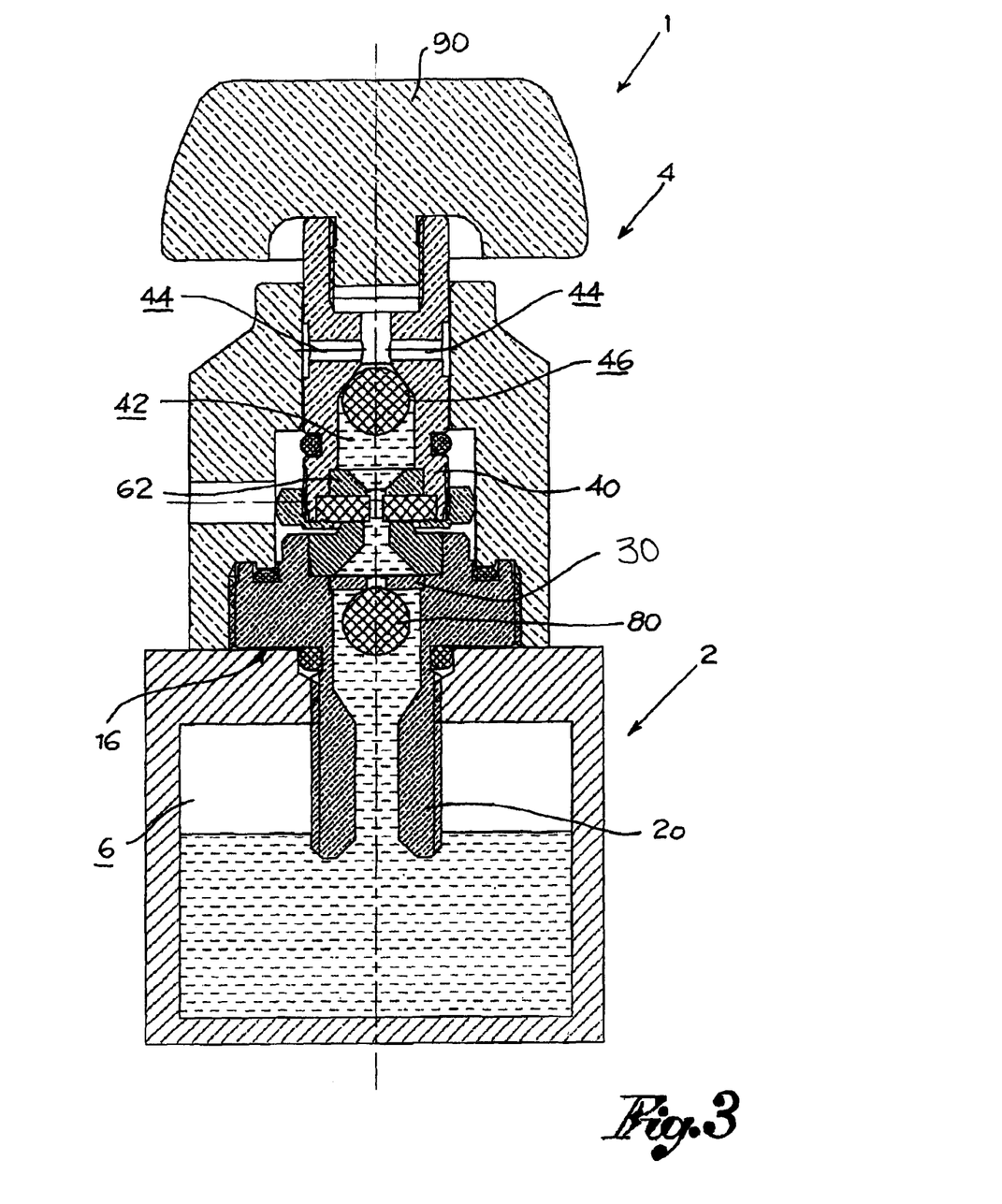
FIG. 3 represents the device in FIG. 1 in a third configuration, called a waiting configuration.

Continuing to heat the tank, the device moves into a waiting configuration (FIG. 3).

In the configuration, for example because of the action of the air sacks present in the chamber 6 of the tank 2, the water goes back up through the flange 16, in particular through the shank 20 of the flange.

Beneath the action of the water, the second floating ball 80 lifts up until it is level with the spacer 30. As the spacer is configured in the form of a perforated cross, also when the ball 80 is resting on the spacer 30, it does not obstruct any passageway, as this is guaranteed by the peripheral openings.

Then the water goes back up through the piston 40, lifting the first ball 70, which is also floating.

The first ball 70 moves into contact inside the conical stop slot 46 of the piston 40, closing the piston at the top.

Note that the piston 40 remains in the lowered position, in other words resting on the insert 32, in particular resting with the base 60 on the insert 32 in this waiting configuration too, because of its weight and the weight of the parts to which it is coupled, for example the handle 90.

In other words, the fluidic continuity between the cavity of the flange 16 and the internal cavity of the piston 40 is also guaranteed in the waiting configuration.

In other words, in this case the fluidic continuity extends to the water present in the tank.

As we can appreciate, the first ball 70, the stop slot 46 and the pad 62 create a preferred embodiment of first intercepting means, set along the first venting path, which are suitable for going from an open configuration (FIG. 2) wherein they allow the air to pass from the internal chamber 6 of the tank 2 to the outside, to a closed configuration (FIG. 3) wherein they close the first air venting path.

Moreover, the first intercepting means can be influenced by the water to go from the open configuration to the closed configuration.

Also note that the first intercepting means are sensitive to the density of an agent acting upon them, going from the open configuration to the closed configuration only when influenced by the water, whose density is different from that of the air.

Figure 4:
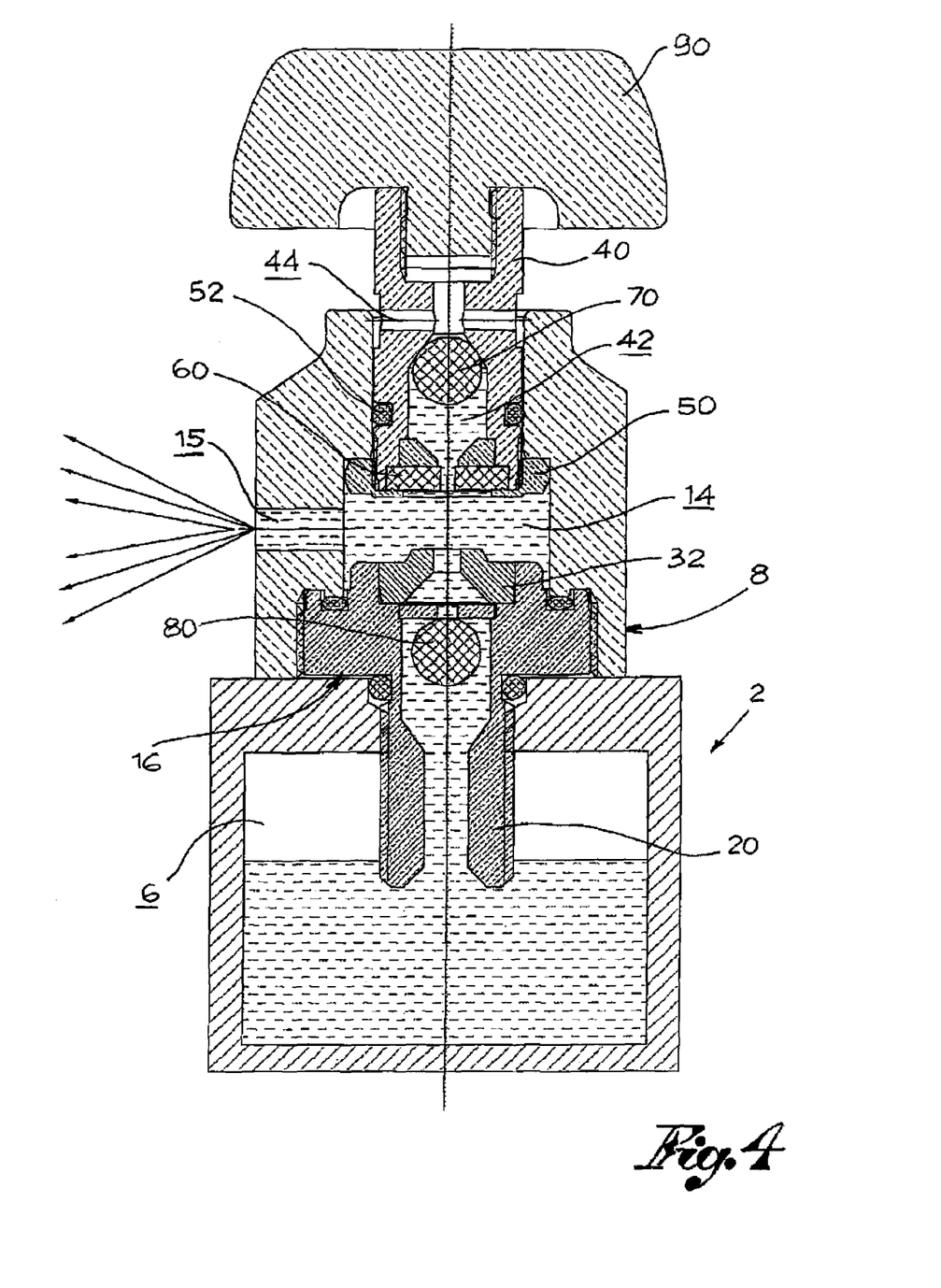
FIG. 4 shows the device in FIG. 1 in a fourth configuration, called a water venting configuration.

Continuing to heat the tank, the water reaches a greater pressure limit, so that the device moves into a water venting configuration (FIG. 4).

In particular, in relation to the greater pressure limit of the water, the pressure influences the piston 40 and lifts it up from the lowered position.

When the piston is lifted, it fluidically joins the central space 14 of the body 8 to the delivery tube 15 of the body 8, so that the water is delivered outside, exactly in relation to the greater pressure limit.

In the configuration, the first ball 70 closes the first venting path due to the water present in the intermediate space 42 of the piston 40.

Moreover, the nut 50, which guides the sliding piston, moves against the wall of the body and stops the travel of the piston 40.

Furthermore, the seal ring 52 moves inside the end space of the body 8, making a seal between the piston and the body.

Furthermore, the seal ring 52 holds the piston in the raised position, overcoming its weight by virtue of the compression it is subjected to between the body and the piston, as well as the consequent friction.

As you can see, the device then comprises a second venting path, which is suitable for connecting the internal chamber 6 of the tank 2 to the outside. The second path is at least partially separate from the first.

The piston 40, the base 60 and the insert 32 make a preferred embodiment of second intercepting means, set along the second venting path, which are suitable for moving from a closed configuration, wherein they close the second passage, to an open configuration, wherein they allow the second fluid to pass from the internal chamber 6 of the tank 2 to the outside.

In other words, the action of the water, brought to the greater pressure limit, not only keeps the first intercepting means in the closed configuration, but also influences the second intercepting means, opening them.

In other words again, the second intercepting means are sensitive to the pressure of the water, moving from the closed configuration to the open configuration when influenced by the water at a particular greater pressure limit.

Furthermore, the seal ring also makes a preferred embodiment of locking means, which are suitable for acting with the second intercepting means to hold them in the open configuration.

Continuing to heat the tank, the water continues to come out of the delivery tube, until there is none left, or almost.

The consumption of the water causes a sudden drop in pressure inside the device. However, the piston remains in the raised position, because of the action of the compressed seal ring.

If the liquid flows back from the delivery tube 15 towards the internal chamber 6 of the tank, the ball 80 moves into contact on the annular projection 22, blocking the passage of the water towards the internal chamber of the tank.

The ball 80 and the annular projection 22 make a preferred embodiment of non-return valve means, which are suitable for preventing the liquid from flowing back to the chamber of the tank.

To use the device again according to the above described methods, you simply have to operate the handle to lower the piston until it is brought back into the lowered position.

As you can see, the device can be used without the functionalities described above, keeping the piston in a raised position.

In this case, first you have a jet of air through the first venting path, and then water, without reaching the greater pressure limit, through the second venting path.

Innovatively, according to the present invention, the device allows water to be delivered at a set greater pressure limit, when air and water are initially contained in the tank.

Advantageously, the air is expelled before, and separately from the water, making sure that the water is expelled at a set greater pressure limit. Various laboratory tests have shown an excellent repeatability of the greater pressure limit at which the water is delivered.

The table below shows the results of the repeatability tests performed: the columns report the results related to the piston opening pressure of the piston, in other words the greater pressure limit at which the water comes out, for three different samples. Ten tests were carried out on each sample.

|  | Piston opening pressure [bar] | | |
| --- | --- | --- | --- |
| n. test | Sample 1 | Sample 2 | Sample 3 |
| 1 | 2.32 | 2.32 | 2.43 |
| 2 | 2.20 | 2.38 | 2.29 |
| 3 | 2.42 | 2.30 | 2.32 |
| 4 | 2.45 | 2.43 | 2.40 |
| 5 | 2.20 | 2.32 | 2.43 |
| 6 | 2.26 | 2.30 | 2.38 |
| 7 | 2.38 | 2.35 | 2.40 |
| 8 | 2.35 | 2.48 | 2.25 |
| 9 | 2.38 | 2.49 | 2.45 |
| 10 | 2.46 | 2.38 | 2.35 |

According to a further advantageous feature, the air is initially expelled from openings, which cannot be accessed by a user, for example under the handle, consequently protecting the user from hot air jets.

Advantageously, the device also exhibits high user safety, because the parts are firmly connected and, in particular, the unscrewing of the body 8 from the flange 16 allows a venting of any air or water left in the tank by the safety millings, before the shank is completely unscrewed.

According to a further advantageous feature, the greater pressure limit is not only determined according to the sole weight of the piston and the parts coupled to it, but also according to the nominal sections of the device.

What is claimed is:

1. A venting device that can be connected to a tank, wherein the tank exhibits an internal chamber containing a first fluid and a second fluid, wherein the device comprises:
    a first venting path suitable for joining the internal chamber of the tank to the outside;
    first intercepting means, set along the first venting path, which are suitable for going from an open configuration, wherein said first intercepting means allow the first fluid to pass from the chamber inside the tank to the outside, to a closed configuration, wherein said first intercepting means close the first path,
    a second venting path, which is suitable for joining the internal chamber of the tank to the outside;
    second intercepting means, set along the second venting path, which are suitable for going from a closed configuration, wherein said second intercepting means close the second passage, to an open configuration, wherein said second intercepting means allow the second fluid to pass from the chamber inside the tank to the outside, the device being characterised in that the first intercepting means can be influenced by the second fluid to go from the open configuration to the closed configuration.

2. Device according to claim 1, wherein the first intercepting means are sensitive to the density of a fluid, going from the open configuration to the closed configuration, when influenced by an agent with a set density.

3. Device according to claim 2, wherein the first intercepting means comprise a moving shutter suitable for floating when immersed in the second fluid.

4. Device according to claim 3, wherein the shutter is a ball.

5. Device according to claim 3, wherein the shutter is made in elastomeric material.

6. Device according to claim 1, wherein the second intercepting means are sensitive to the pressure of a fluid, going from the closed configuration to the open configuration when influenced by a agent at a set greater pressure limit.

7. Device according to claim 6, wherein the second intercepting means comprise a piston, which closes the second venting path in the closed configuration of the second intercepting means.

8. Device according to claim 7, wherein the piston is hollow inside and houses the first intercepting means inside.

9. Device according to claim 8, wherein the piston slides inside a central space of a body, and wherein the device comprises sealing means that are suitable for making a seal between the piston and the body, in the open configuration of the second intercepting means.

10. Device according to claim 9, wherein the sealing means comprise a seal ring, in the closed configuration of the second intercepting means, the seal ring being set in the central space of the body.

11. Device according to claim 7, wherein the device comprises guiding means for the piston, which are suitable for guiding the piston between the closed configuration and the open configuration of the second intercepting means.

12. Device according to claim 1, wherein the device comprises non-return valve means, which are suitable for preventing the fluids from flowing back from the device to the chamber of the tank.

13. Device according to claim 12, wherein the first venting path and the second venting path exhibit a common part, and wherein the non-return valve means are set in the common part.

14. Device according to claim 12, wherein the non-return valve means comprise a ball made in elastomer.

15. Device according to claim 1, wherein the first venting passage exhibits a first outlet opening to let the first fluid out and the second venting passage exhibits a second outlet opening to let the second fluid out, the first outlet and the second outlet being different from each other.

16. Device according to claim 15, wherein, after connecting the device to the tank, the first outlet is set at a height that is greater than the height at which the second outlet is set.

17. Device according claim 16, also comprising locking means, which are suitable for acting with the second intercepting means to hold them in the open configuration.

18. Device according to claim 17, wherein the locking means comprise a seal ring.

19. Device according to claim 17, wherein the locking means comprise a handle that is connected to the second intercepting means to bring them manually into the open configuration.

20. Device according to claim 1, comprising a body with a central space and a piston, sliding in the body, the first venting passage comprising at least one part of a cavity inside the piston.

21. Device according to claim 20, wherein the second venting passage comprises the central space of the body and at least one delivery tube made in the body, which is joined to the outside.

22. Apparatus comprising
a closed tank, with an internal chamber, suitable to contain a first fluid and a second fluid, and
a venting device connected to the tank, comprising
a) a first venting path suitable for joining the internal chamber of the tank to the outside;
b) first intercepting means, set along the first venting path, which are suitable for going from an open configuration, wherein said first intercepting means allow the first fluid to pass from the chamber inside the tank to the outside, to a closed configuration, wherein said first intercepting means close the first path,
c) a second venting path, which is suitable for joining the internal chamber of the tank to the outside;
d) second intercepting means, set along the second venting path, which are suitable for going from a closed configuration, wherein said second intercepting means close the second passage, to an open configuration, wherein said second intercepting means allow the second fluid to pass from the chamber inside the tank to the outside,
wherein the first intercepting means can be influenced by the second fluid to go from the open configuration to the closed configuration
and wherein the venting device is connected mechanically movably to the tank, the venting paths being fluidically joined to the chamber of the tank.

23. Apparatus according to claim 22, wherein the tank is suitable for heating.

24. A venting device that can be connected to a tank, wherein the tank exhibits an internal chamber containing a first fluid and a second fluid, wherein the device comprises:
a first venting path, which is suitable for joining the internal chamber of the tank to the outside;
first intercepting means, set along the first venting path, which are suitable for going from an open configuration, wherein said first intercepting means allow the first fluid to go from the chamber inside the tank to the outside, to a closed configuration, wherein said first intercepting means close the first path,
a second venting path, which is suitable for joining the internal chamber of the tank to the outside;
second intercepting means, set along the second venting path, which are suitable for going from a closed configuration, wherein said second intercepting means close the second passage, to an open configuration, wherein said second intercepting means allow the second fluid to go from the internal chamber of the tank to the outside,
wherein the first venting path for the first fluid is at least partially separate from the second venting path for the second fluid.

* * * * *

UNITED STATES PATENT AND TRADEMARK OFFICE
CERTIFICATE OF CORRECTION

| | |
|---|---|
| PATENT NO. | : 7,762,273 B2 |
| APPLICATION NO. | : 11/770910 |
| DATED | : July 27, 2010 |
| INVENTOR(S) | : Cesare Bottura |

It is certified that error appears in the above-identified patent and that said Letters Patent is hereby corrected as shown below:

Column 6, Claim 2, line 57, "an agent" should read --a fluid--.

Column 6, Claim 6, line 67, "agent" should read --fluid--.

Signed and Sealed this

Second Day of November, 2010

David J. Kappos
*Director of the United States Patent and Trademark Office*